(12) United States Patent
Wada et al.

(10) Patent No.: US 9,990,600 B2
(45) Date of Patent: Jun. 5, 2018

(54) DELIVERY PREDICTION SYSTEM AND METHOD ACCELERATED BY α DAYS

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., LTD., Tokyo (JP)

( * ) Notice: Subject to any disclaimer, the term of this patent is extended or adjusted under 35 U.S.C. 154(b) by 13 days.

(21) Appl. No.: 15/025,221

(22) PCT Filed: Sep. 26, 2014

(86) PCT No.: PCT/JP2014/004946
§ 371 (c)(1),
(2) Date: Mar. 25, 2016

(87) PCT Pub. No.: WO2015/045407
PCT Pub. Date: Apr. 2, 2015

(65) Prior Publication Data
US 2016/0239793 A1    Aug. 18, 2016

(30) Foreign Application Priority Data

Sep. 27, 2013   (JP) ................................ 2013-201708

(51) Int. Cl.
*G06Q 10/04*   (2012.01)
*G06Q 10/08*   (2012.01)
(Continued)

(52) U.S. Cl.
CPC .......... *G06Q 10/083* (2013.01); *G06Q 10/04* (2013.01); *G06Q 10/08* (2013.01); *G06Q 10/087* (2013.01); *G06Q 50/06* (2013.01); *G06Q 50/28* (2013.01)

(58) Field of Classification Search
CPC .......... G06Q 10/08; G06Q 10/04; F17C 13/00
(Continued)

(56) References Cited

U.S. PATENT DOCUMENTS 4,213,476 A * 7/1980 Bresie ..................... E21B 43/00
137/2
5,265,032 A * 11/1993 Patel ..................... F17C 13/021
379/106.06
(Continued)

FOREIGN PATENT DOCUMENTS

| JP | H08329159 | 12/1996 |
|----|-----------|---------|
| JP | 2006285477 | 10/2006 |
| JP | 2012232841 | 11/2012 |

OTHER PUBLICATIONS

PCT International Preliminary Report on Patentability for corresponding PCT Application No. PCT/JP2014/004946 dated Apr. 7, 2016, 6 pages.

*Primary Examiner* — Oluseye Iwarere
(74) *Attorney, Agent, or Firm* — Lee & Hayes, PLLC

(57) ABSTRACT

In an LP gas delivery business, when the preparation of a delivery list for a next day delivery amount is followed by a delivery operation, a discrepancy is caused between the delivery list and a delivery record. On the other hand, the delivery due date is determined so as to avoid a gas shortage. The delivery prior to the delivery due date has no problem. Thus, the delivery list in the LP gas delivery business is prepared by setting, as data for a next day delivery amount, not data having a delivery due date of a next day but data after α days (e.g., after 2 days).

8 Claims, 8 Drawing Sheets

(51) Int. Cl.
*G06Q 50/06* (2012.01)
*G06Q 50/28* (2012.01)

(58) Field of Classification Search
USPC ...... 702/45, 188; 705/337, 377, 28; 141/231
See application file for complete search history.

(56) References Cited

U.S. PATENT DOCUMENTS

| | | | | |
|---|---|---|---|---|
| 5,975,162 A * | 11/1999 | Link, Jr. | ............... | F17C 13/002 141/192 |
| 9,171,270 B2 * | 10/2015 | Wada | ..................... | G06Q 10/04 |
| 9,396,449 B2 * | 7/2016 | Wada | ..................... | G06Q 10/06 |
| 2004/0148236 A1 * | 7/2004 | Steidlmayer | ........... | G06Q 10/10 705/35 |
| 2006/0085450 A1 * | 4/2006 | Seubert | ................. | G06Q 30/04 |
| 2006/0157148 A1 * | 7/2006 | Hillam | .................. | B67D 7/222 141/198 |
| 2007/0050278 A1 * | 3/2007 | Steidlmayer | ........... | G06Q 40/04 705/37 |
| 2012/0104123 A1 * | 5/2012 | White | .................... | C10L 5/366 241/3 |
| 2014/0058775 A1 * | 2/2014 | Siig | ........................ | G06Q 10/06 705/7.12 |
| 2014/0278706 A1 * | 9/2014 | Leidner | ............ | G06Q 10/06315 705/7.25 |
| 2015/0127572 A1 * | 5/2015 | Wada | ..................... | G06Q 50/06 705/337 |
| 2015/0149097 A1 * | 5/2015 | Wada | ..................... | G06Q 10/04 702/45 |
| 2015/0170308 A1 * | 6/2015 | Wada | ..................... | G06Q 50/06 705/7.21 |
| 2015/0178653 A1 * | 6/2015 | Wada | ..................... | G06Q 50/06 705/7.25 |
| 2015/0193842 A1 * | 7/2015 | Wada | ..................... | G06Q 30/04 705/34 |
| 2015/0379465 A1 * | 12/2015 | Wada | ..................... | G06Q 10/06 235/376 |
| 2015/0379541 A1 * | 12/2015 | Wada | ..................... | G06Q 50/06 705/7.35 |
| 2016/0196521 A1 * | 7/2016 | Wada | ..................... | G06Q 50/06 705/7.25 |

\* cited by examiner

| CUSTOMER ID | CUSTOMER NAME | CUSTOMER ADDRESS | CUSTOMER TELEPHONE NUMBER | SUPPLY FACILITY ID | CURRENT METER INDICATION DATE | CURRENT METER INDICATION VALUE | PREVIOUS METER INDICATION DATE | PREVIOUS METER INDICATION VALUE |
|---|---|---|---|---|---|---|---|---|
| 00000001 | TOKYO TAROU | ...MINATO-KU,TOKYO | 03-1111-1111 | 00001 | 2013/09/01 | 99.9 | 2013/08/02 | 99.9 |
| 00000002 | JITSUAN JIROU | ...MINATO-KU,TOKYO | 03-2222-2222 | 00001 | 2013/09/01 | 99.9 | 2013/08/02 | 99.9 |
| 00000003 | ISYOU SABUROU | ...MINATO-KU,TOKYO | 03-3333-3333 | 00001 | 2013/09/01 | 99.9 | 2013/08/02 | 99.9 |
| 00000004 | SYOUHYOU SHIROU | ...MINATO-KU,TOKYO | 03-4444-4444 | 00001 | 2013/09/02 | 99.9 | 2013/08/02 | 99.9 |
| 00000005 | . | . | . | 00005 | 2013/09/02 | 99.9 | 2013/08/02 | 99.9 |
| 00000006 | . | . | . | 00002 | 2013/09/02 | 99.9 | 2013/08/02 | 99.9 |
| 00000007 | . | . | . | 00008 | 2013/09/02 | 99.9 | 2013/08/02 | 99.9 |
| 00000008 | . | . | . | 00006 | 2013/09/02 | 99.9 | 2013/08/02 | 99.9 |
| 00000009 | . | . | . | 00005 | 2013/09/02 | 99.9 | 2013/08/03 | 99.9 |
| 00000010 | . | . | . | 00003 | 2013/09/03 | 99.9 | 2013/08/03 | 99.9 |
| . | . | . | . | . | . | . | . | . |
| . | . | . | . | . | . | . | . | . |
| . | . | . | . | . | . | . | . | . |

FIG.3

| SUPPLY FACILITY ID | DELIVERY ADDRESS | CAPACITY | CYLINDER COUNT | DELIVERY DUE DATE | UNDELIVERED TASK FLAG |
|---|---|---|---|---|---|
| 00001 | ...MINATO-KU,TOKYO | 20 | 2 | 2013/09/17 | 0 |
| 00002 | ...MINATO-KU,TOKYO | 30 | 1 | 2013/09/18 | 0 |
| 00003 | ...MINATO-KU,TOKYO | 30 | 1 | 2013/09/12 | 0 |
| 00004 | ...MINATO-KU,TOKYO | 30 | 2 | 2013/09/21 | 0 |
| 00005 | . . . | 20 | 2 | 2013/09/02 | 1 |
| 00006 | . . . | 30 | 2 | 2013/09/04 | 0 |
| 00007 | . . . | 30 | 1 | 2013/09/09 | 0 |
| 00008 | . . . | 50 | 1 | 2013/09/24 | 0 |
| 00009 | . . . | 30 | 1 | 2013/09/13 | 0 |
| 00010 | . . . | 30 | 1 | 2013/09/23 | 0 |
| . . . | . . . | . . . | . . . | | . . . |
| . . . | . . . | . . . | . . . | | . . . |
| . . . | . . . | . . . | . . . | | . . . |

FIG.4

| SUPPLY FACILITY ID | CAPACITY | CYLINDER COUNT | PREVIOUS DELIVERY DATE |
|---|---|---|---|
| 00001 | 20 | 2 | 2013/09/01 |
| 00002 | 30 | 1 | 2013/08/03 |
| 00003 | 30 | 1 | 2013/08/18 |
| 00004 | 30 | 2 | 2013/09/02 |
| 00005 | 20 | 2 | 2013/08/22 |
| 00006 | 30 | 2 | 2013/08/25 |
| 00007 | 30 | 1 | 2013/08/27 |
| 00008 | 50 | 1 | 2013/08/24 |
| 00009 | 30 | 1 | 2013/08/30 |
| 00010 | 30 | 1 | 2013/09/03 |
| . | . | . | . |
| . | . | . | . |
| . | . | . | . |

FIG.5

| SUPPLY FACILITY ID | DELIVERY ADDRESS | CAPACITY | CYLINDER COUNT | DELIVERY DUE DATE | UNDELIVERED TASK FLAG | RESPONSIBLE DELIVERYMAN ID |
|---|---|---|---|---|---|---|
| 00005 | ...MINATO-KU,TOKYO | 20 | 2 | 2013/09/02 | 1 | 0001 |
| 10001 | ...MINATO-KU,TOKYO | 20 | 2 | 2013/09/02 | 1 | 0001 |
| 10002 | ...MINATO-KU,TOKYO | 30 | 1 | 2013/09/02 | 1 | 0001 |
| 10003 | ...MINATO-KU,TOKYO | 30 | 1 | 2013/09/02 | 1 | 0001 |
| 10004 | · | 30 | 2 | 2013/09/02 | 1 | 0001 |
| 10005 | · | 30 | 2 | 2013/09/02 | 1 | 0001 |
| 10006 | · | 30 | 1 | 2013/09/06 | 0 | 0001 |
| 10007 | · | 50 | 1 | 2013/09/06 | 0 | 0001 |
| 10008 | · | 30 | 1 | 2013/09/06 | 0 | 0001 |
| 10009 | · | 30 | 1 | 2013/09/06 | 0 | 0001 |
| · | · | · | · | | · | · |
| · | · | · | · | | · | · |

FIG.6

DELIVERY PREDICTION SYSTEM AND METHOD ACCELERATED BY α DAYS

TECHNICAL FIELD

The present invention relates to delivery prediction system and method accelerated by α days.

BACKGROUND ART

LP gas is classified into imports from gas producing countries and domestic production including by-products from production processes of petroleum products. Import terminals where LP gas carried from gas producing countries by tankers is stored and petroleum refinery terminals are referred to as primary terminals. LP gas is loaded into domestic vessels or tank trucks at a primary terminal and shipped to secondary terminals that are transit stations for LP gas transportation which are located longshore or inland. Then, the LP gas carried to a secondary terminal is transported to LP gas filling stations in various locations (delivery bases), where gas cylinders are filled with the LP gas.

Gas cylinders filled at the respective delivery bases are delivered by a deliveryman to customer homes such as general households, collective housings, and business facilities. A gas cylinder (supply facility) and a customer may have a one-to-one relation or one gas cylinder used in a collective housing and a plurality of customer users may have therebetween a one-to-plural relation. A used gas cylinder in a customer home is exchanged for a filled gas cylinder and is collected at a delivery base. Each delivery base is associated with a fixed delivery area for which a deliveryman is responsible. Based on a delivery list, each deliveryman visits customer homes within the delivery area and delivers gas cylinders.

The delivery list is prepared by predicting the amount of LP gas remaining in the gas cylinder based on the past gas usage results of the respective customers, the meter indication input results of the gas meters of the customer homes (also may be called customers), and delivery records for example collected in the database to carry out a delivery due date adjustment (also may be called delivery prediction) to prevent a gas shortage in the gas cylinder. Delivery lists are individually prepared for the respective responsible deliverymen and are distributed to mobile terminals carried by the respective deliverymen. The delivery lists are distributed to the respective deliverymen for each delivery due date at a date one day prior to the delivery due date. This allows the respective deliverymen to check the delivery route in advance and to plan a delivery schedule.

As described above, since the delivery list is distributed at a date one day prior to the delivery due date, the delivery list for the delivery on the next day is prepared based on the delivery record at a predetermined time (e.g., 17:00) at a date one day prior to the delivery due date. Specifically, the scheduled delivery amount of the current day not yet delivered at the timing of the preparation of the delivery list is included in the delivery list as each deliveryman's undelivered task data. However, the delivery operation is actually continued even after the inclusion and may be continued until late at night. In this case, the delivery list will include each deliveryman's undelivered task data including data regarding already-delivered ones (which causes a discrepancy between the delivery list and the delivery record). Therefore, data including the discrepancy is extracted and is used to instruct the respective deliverymen about delivery addresses not requiring delivery on the delivery due date.

This instruction is based on a completely-analog operation and is not carried out by using computer processing to delete delivery address data from the delivery list or by distributing a new delivery list. Even when the latest delivery list is distributed by computer processing, there may be a case where delivery schedules or delivery routes planned in advance by the deliverymen must be changed significantly. Furthermore, delivery addresses to which the delivery is already completed after 17:00 on the previous day do not always uniformly occur for the respective deliverymen. Specifically, if the respective deliverymen are notified of the delivery addresses not requiring the delivery on the delivery due date, the scheduled delivery count of gas cylinders for the deliverymen may not be notified based on the latest situation. In this case, the deliverymen may have to move or exchange the delivery addresses. This consequently prevents an effective use of the delivery list distributed on the previous day. On the other hand, the delivery due date is determined so as to prevent a gas shortage. Thus, delivery prior to the delivery due date has no problem.

The present invention has been made in view of the disadvantages as described above. It is an objective of the invention to prepare a delivery list for an LP gas delivery business based on a delivery due date which does not correspond to data for the next day but corresponds to data α days later (e.g., 2 days later) as a next day delivery amount.

SUMMARY OF INVENTION

In order to achieve the objective as described above, the present invention provides a method of predicting a delivery due date for an LP gas delivery business and preparing a delivery list for next day delivery, comprising:
  acquiring customer data, wherein the customer data includes at least an identifier for a customer of a delivery address, an identifier for an supply facility associated, and meter indication data;
  calculating usage of the supply facility based on a difference of the meter indication data for a fixed period;
  acquiring supply facility data using the identifier of the supply facility, wherein the supply facility data includes at least the identifier of the supply facility, a gas capacity and a set number of the supply facility, and a previous delivery date;
  calculating a master capacity representing a total capacity of the supply facility based on the gas capacity and the set number;
  predicting a date at which the supply facility will have a gas shortage based on the master capacity, the previous delivery date, and the usage to calculate the delivery due date;
  preparing the delivery list based on the supply facility data for which the calculated delivery due date is a due date after predetermined days and the supply facility data of an undelivered task; and
  transmitting the delivery list to a mobile terminal carried by a deliveryman.

In the invention according to the above section, the predetermined days are 2 days and the undelivered task is an undelivered task as of a previous day.

In the invention according to the above two sections, the delivery list is sorted so that a supply facility included in the undelivered task is prioritized as a delivery destination.

In the invention according to the above three sections, the delivery list is prepared based on the delivery capability of each deliveryman of one business office and one responsible area.

In the invention according to the above section, the delivery capability is a cylinder count that can be delivered to the supply facility by the each deliveryman per day.

ADVANTAGEOUS EFFECTS OF INVENTION

As described above, a delivery list for an LP gas delivery business is prepared by preparing a list including data of a delivery due date after α days (e.g., 2 days) as data showing a next day delivery amount. During this, each deliveryman's undelivered task data of the previous day is added to the delivery list. Specifically, a delivery list is prepared by setting data of a delivery due date of September 3 as data of a delivery due date of September 2 for example. Data corresponding to a cylinder count that was not delivered on September 2 is added to a delivery list for September 4 prepared at 17:00 on September 3. This consequently eliminates the discrepancy between the delivery list and the delivery record, thus providing an effective use of the delivery list.

BRIEF DESCRIPTION OF THE DRAWINGS

FIG. 3 illustrates one example of data stored in a customer data storage unit according to one embodiment of the present invention;

FIG. 4 illustrates one example of data stored in a delivery prediction data storage unit according to one embodiment of the present invention;

FIG. 5 illustrates one example of data stored in a supply facility data storage unit according to one embodiment of the present invention;

FIG. 6 illustrates one example of data stored in a delivery list data storage unit according to one embodiment of the present invention;

DESCRIPTION OF EMBODIMENTS

The following section will describe in detail a method and a system according to an embodiment of the present invention with reference to the attached drawings.

Figure 1:
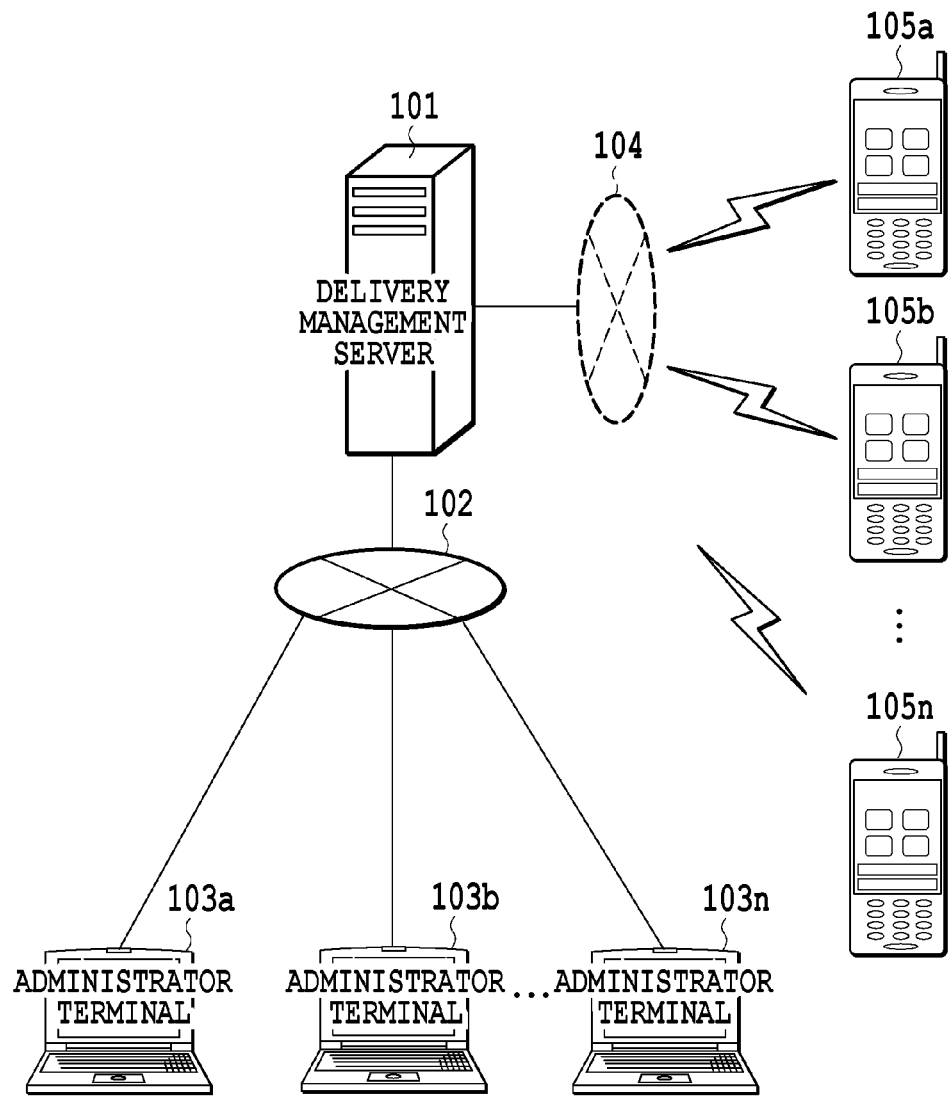
FIG. 1 illustrates a network configuration according to one embodiment of the present invention.

FIG. 1 illustrates a network configuration according to one embodiment of the present invention. In FIG. 1, a delivery management server 101 provided at a data center for example is configured to communicate, via a network 102, with a plurality of administrator terminals 103a, 103b, . . . , and 103n provided at the respective business offices (hereinafter referred to as the administrator terminals 103) and to communicate, via a network 104, with a plurality of mobile terminals 105a, 105b, . . . , and 105n (hereinafter referred to as "mobile terminals 105"). The mobile terminal 105 is carried by a deliveryman carrying out a delivery operation.

The delivery management server 101 adjusts the delivery due date by predicting the amount of LP gas remaining in the gas cylinder based on the past gas usage records of the respective customers, the meter indication result of the gas meter of the customer home, and the delivery record (delivery prediction) to thereby prepare a delivery list. The delivery list is prepared once a day (for example, a delivery list of the next day delivery amount is prepared at 17:00). In this embodiment, the delivery list is not prepared based on data of the delivery due date of the next day as in a conventional case but based on data of the delivery due date after α days (e.g., after 2 days). An administrator for example can refer to and change the delivery list via an administrator terminal 103.

The prepared delivery list is distributed from a delivery management server 101 to the mobile terminal 105 carried by each responsible person. The distributed delivery list data includes data related to the operation responsible for each responsible person only. Specifically, each responsible person cannot refer to operation data of other responsible persons from the viewpoints of preventing an unwanted operation or providing security. However, in another embodiment, in order to refer to operation data of other responsible persons, data related to operations responsible for other responsible persons also can be downloaded to the mobile terminal 105.

Figure 2:
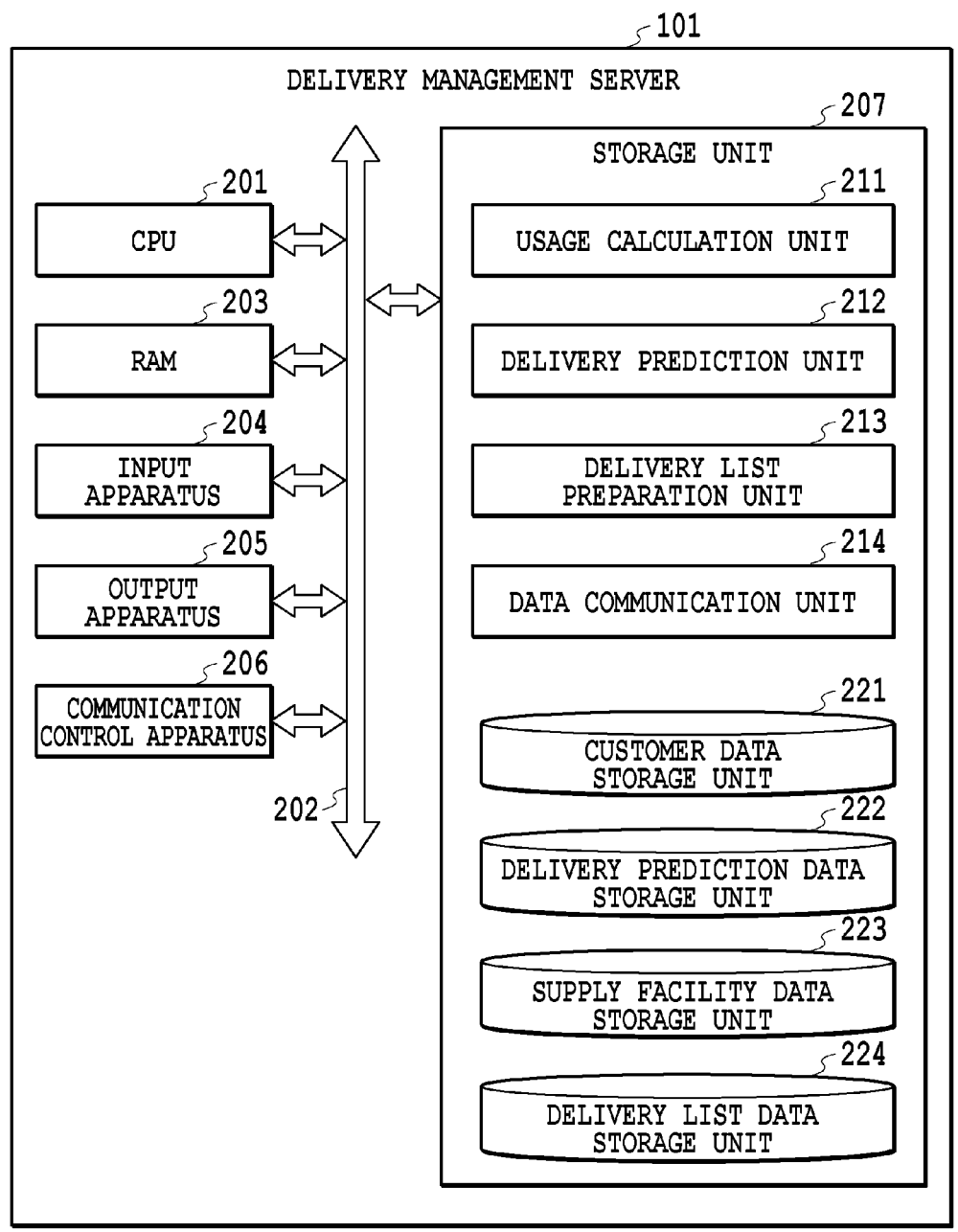
FIG. 2 is a block diagram illustrating the configuration of a delivery management server according to one embodiment of the present invention.

Next, with reference to the block diagram of FIG. 2, the following section will describe in detail the configuration of the delivery management server 101 described above.

The delivery management server 101 has a configuration in which a CPU 201 is connected, via a system bus 202, to a storage unit 207 composed of an RAM 203, an input apparatus 204, an output apparatus 205, a communication control apparatus 206, and a nonvolatile memory medium (e.g., ROM or HDD). The storage unit 207 includes a program storage region for storing a software program for providing the respective functions according to the present invention and a data storage region for storing data used or prepared by the software program. In an actual case, the respective units of the program storage region (which will be described later) are an independent software program or the routine or components thereof for example. They are called by the CPU 201 from the storage unit 207 and are developed in the work area of the RAM 203 and are sequentially executed to thereby provide the respective functions.

The data storage region in the delivery management server 101 includes components related to the present invention such as a customer data storage unit 221, a delivery prediction data storage unit 222, and a supply facility data storage unit 223 any of which is a fixed storage region secured in a storage medium 207.

The customer data storage unit 221 stores data related to customers of delivery addresses. In one embodiment, the customer data includes the names and addresses of the respective customers, supply facility IDs for identifying associated supply facilities (gas cylinders), and the meter indication results of gas meters for example.

The delivery prediction data storage unit 222 stores data regarding the predicted delivery result. In one embodiment, the delivery prediction data includes a supply facility ID for identifying a supply facility, a delivery address, the capacity and the set number of gas cylinder(s) as a supply facility, and the predicted delivery due date for example.

The supply facility data storage unit 223 stores the data regarding the gas cylinder as a supply facility. In one embodiment, the supply facility data includes the supply facility ID for identifying the supply facility, the capacity and the set number of the gas cylinder(s), and the previous delivery date for example. The supply facility data and the customer data stored in the customer data storage unit 221 are associated to have a one-to-one relation or a one-to-plural relation therebetween.

The delivery list data storage unit 224 stores the data regarding the delivery list. In one embodiment, the delivery list data includes the supply facility ID for identifying the supply facility of the delivery address, the delivery address, the capacity and the set number of the gas cylinder (s) as a supply facility of the delivery address, the delivery due date, an undelivered task flag showing that the delivery could not be achieved at the delivery due date, and a responsible deliveryman ID for identifying a deliveryman responsible for the delivery for example. The undelivered task flag is set to "1" when the delivery could not be achieved at the delivery due date for example.

The software program stored in the program storage region of the delivery management server 101 includes units related to the present invention such as a usage calculation unit 211, a delivery prediction unit 212, a delivery list preparation unit 213, and a data communication unit 214.

The usage calculation unit 211 acquires the customer data from the customer data storage unit 221. Then, based on the difference in the meter indication data of the monthly meter reading for example, the monthly usage of each customer is calculated. In the case of a new customer, no past meter indication data is available. Thus, a specific usage also can be determined as the usage of the new customer based on the number of gas facilities such as a stove burner, a water heater, or heating equipment and the hearing data such as data for the usage situation (the number of family members, usage frequency).

The delivery prediction unit 212 calculates the master capacity showing the total capacity of the supply facility and calculates the delivery due date using the use record of each customer, the meter indication data of the gas meter, and the delivery record.

The delivery list preparation unit 213 prepares the delivery list as a delivery schedule based on the delivery due date calculated by the delivery prediction unit 212 and the delivery capabilities of the respective deliverymen.

The data communication unit 214 sends the delivery list prepared by the delivery list preparation unit 213 to the mobile terminals 105 carried by the respective deliverymen. The data communication unit 214 receives a reference request regarding the delivery list for example from the administrator terminal 103 owned by the administrator of each business office and provides the delivery list to the administrator terminal 103.

Figure 7:
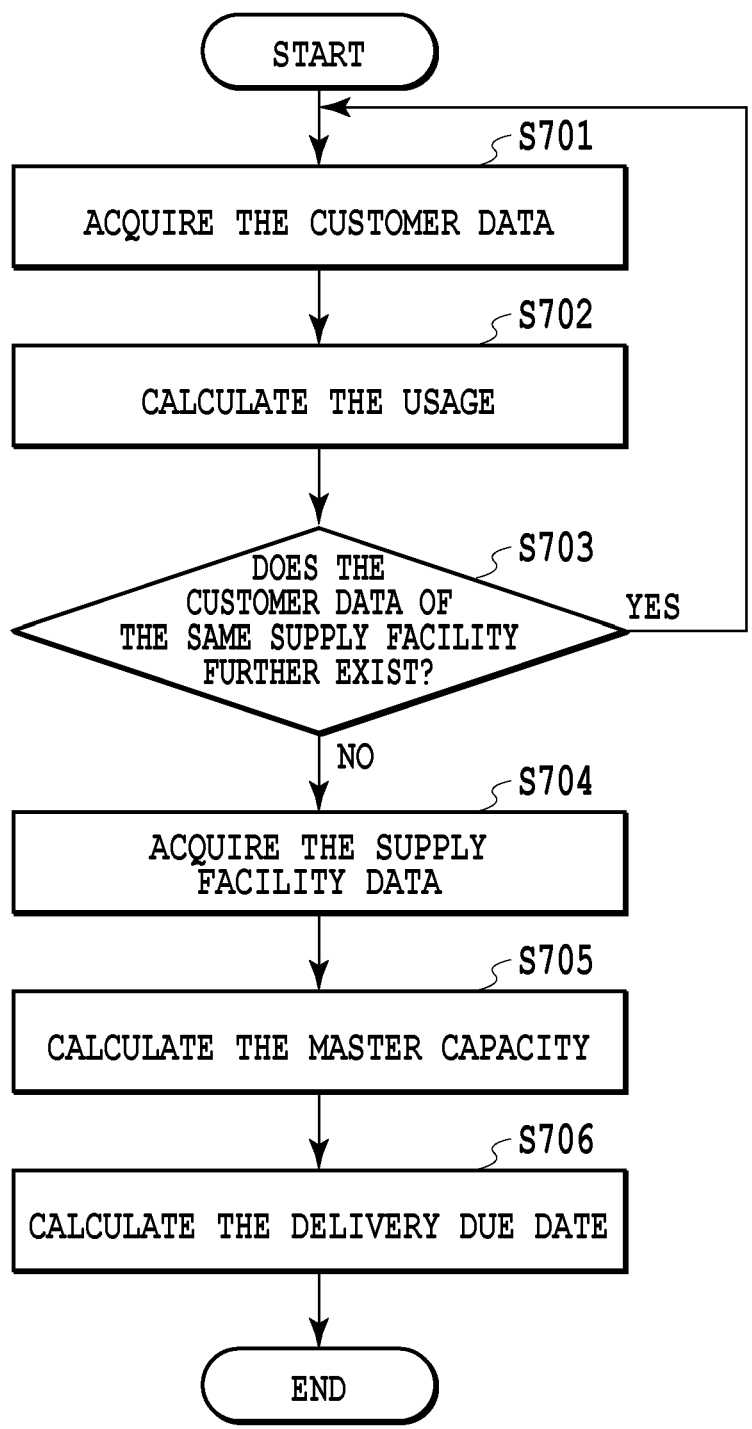
FIG. 7 is a flowchart illustrating a delivery prediction processing according to one embodiment of the present invention.

Next, with reference to the flowchart of FIG. 7 and the tables of FIGS. 3-6, the following section will describe in detail the delivery prediction processing according to one embodiment of the present invention. In one embodiment, the delivery prediction processing is a batch processing carried out at 17:00 every day.

FIG. 7 is a flowchart illustrating a delivery prediction processing according to one embodiment of the present invention. The delivery prediction is processed on the basis of a unit of a supply facility. First, in Step 701, the usage calculation unit 211 acquires data for one customer from the customer data associated with an arbitrary supply facility (or having an arbitrary supply facility ID). In one embodiment, the customer data includes customer data as delivery address data as shown in FIG. 3, an associated supply facility ID, and list data including the current and previous meter indication data for example. Thus, in the cased of the data shown in FIG. 3, the data for one customer is data corresponding to one record.

Next, based on the customer data, the usage calculation unit 211 calculates the usage (step 702). In one embodiment, the monthly usage can be calculated based on a difference between the meter indication data of the current meter reading of the customer data and the meter indication data of the previous meter reading. The meter indication data is not limited to those of the current and previous meter readings. For example, in addition to the customer data, the respective pieces of meter indication data can be accumulated as meter indication history data (not shown). Thus, the usage calculation in Step 702 can calculate an average value based on the difference of the meter indication data of the respective months in a fixed period (e.g., one year). Then, the average value can be set as a monthly usage. Since the usage may be different seasonally, the monthly usage also can be calculated based on the meter indication data near the same month in the past (e.g., the difference of the meter indication data from December to February of the respective years in the past is averaged to calculate the monthly usage). Furthermore, the daily usage also can be calculated by dividing the calculated monthly usage by the difference of days between the previous meter indication date and the current meter indication date.

After calculating the usage in Step 702, the usage calculation unit 211 determines whether customer data of the same supply facility further exists or not (Step 703). When the customer data further exists, the processing proceeds to an Yes route and the usage calculation unit 211 acquires the next customer data (Step 701). Next, in Step 702, as in the above section, the usage (the monthly usage and the daily usage) is calculated with regard to the next customer data during which the calculated usage is added to the previous usage of the customer data. Specifically, the usage of the supply facility is calculated by calculating the total of the usage of customers associated with the supply facility. Thus, Steps 701-703 are repeated until no more customer data regarding the supply facility is found to calculate the total of the usage.

Next, the delivery prediction unit 212 acquires supply facility data by using the supply facility ID included in the customer data as a search key (Step 704). In one embodiment, the supply facility data includes the list data as shown in FIG. 5 such as supply facility IDs for identifying supply facilities, the capacities and the set numbers of gas cylinders, and the previous delivery dates.

Next, the delivery prediction unit 212 acquires, from the supply facility data, the capacity and the set number of the supply facility as a processing target and multiplies the capacity and the set number to thereby calculate the master capacity showing the total capacity of the supply facility (Step 705). For example, when the supply facility has two gas cylinders each having a capacity of 20 kg, the master capacity can be calculated by 20 kg×2=40 kg. Specifically, the complete exhaustion of gas of the master capacity will result in a gas shortage.

Next, the delivery prediction unit 212 uses the daily usage calculated in Step 702 and the master capacity calculated in Step 705 to calculate the delivery due date (Step 706). For example, it is assumed that the supply facility having the previous delivery date of Sep. 1, 2013 and the master capacity of 60 kg has a daily usage of 1 m$^3$. In order to convert lube (m³) to kg, a vaporizing degree is used. The vaporizing degree represents a probability at which propane gas turns into gas. The vaporizing degree varies depending on a temperature and is 0.482 m³/kg in the case of Tokyo for example. Thus, in the case of Tokyo, the daily usage per 1 m³ is about 2 kg. Therefore, a supply facility having a master capacity of 60 kg will be exhausted after 30 days. Thus, a gas shortage will occur at Oct. 1, 2013 which is 30 days after the previous delivery date of Sep. 1, 2013. Thus, a delivery due date is determined as Sep. 30, 2013 one day prior to the date at which a gas shortage will occur.

The delivery due date calculated in Step 706 is based on an assumption that gas is used in an average manner. In other embodiments, a risk factor can be used to take risk into consideration. For example, by multiplying the master capacity with the risk factor (e.g., 0.8), the date at which 80% of the master capacity is exhausted can be considered as a delivery due date. In this case, in the case of the above example, 48 kg occupying 80% of the master capacity of 60 kg will be exhausted after 24 days and thus the delivery due date is determined as September 25. Specifically, a difference of 5 days between September 25 and September 30 calculated when no risk is considered can be considered as risk.

In Step 706, the calculated delivery due date is updated by being overwritten on the "delivery due date" of the supply facility data (FIG. 4). After Step 706, this processing is completed. In an actual case, this processing is repeated for the number of supply facilities responsible for the business office to thereby calculate all delivery due dates.

Figure 8:
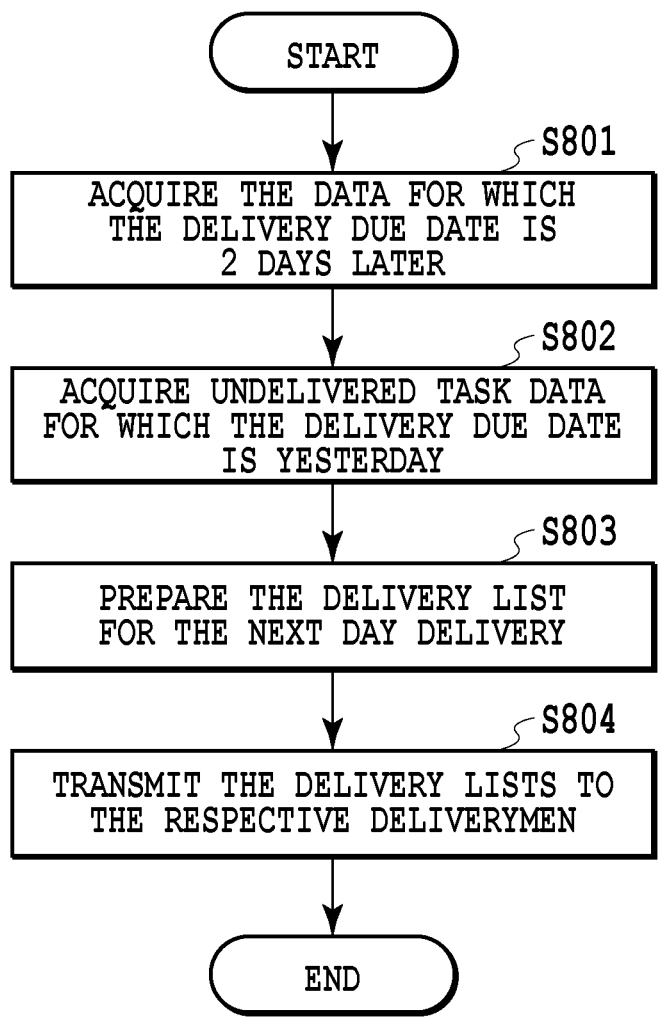
FIG. 8 is a flowchart illustrating a delivery list preparation processing according to one embodiment of the present invention.

Next, with reference to the flowchart of FIG. 8 and the table of FIG. 4, the following section will describe in detail the flow of the delivery list preparation processing according to one embodiment of the present invention. In one embodiment, the delivery list preparation processing is a batch processing executed after the delivery prediction processing (FIG. 7) daily executed at 17:00. In this case, the delivery list of the next day scheduled delivery amount is prepared. In this embodiment in particular, the delivery list of the next day scheduled delivery amount is prepared based on data for which the delivery due date predicted through the delivery prediction processing (FIG. 7) is α days (e.g., 2 days) later.

First, in Step 801, the delivery list preparation unit 213 acquires, from the supply facility data (FIG. 4), the data for which the delivery due date is 2 days later. Next, the delivery list preparation unit 213 acquires, from the supply facility data (FIG. 4), the data for which the delivery due date is yesterday and has an undelivered task (e.g., an undelivered task flag of 1) (Step 802).

Next, the delivery list preparation unit 213 prepares the delivery list of the next day delivery amount based on the data for which the delivery due date acquired in Step 801 is 2 days later and the each deliveryman's undelivered task data acquired in Step 802 (Step 803). In one embodiment, the delivery list includes list data as shown in FIG. 6 such as the supply facility ID for identifying the supply facility of the delivery address, the delivery address, the capacity and the set number of a gas cylinder(s) as a supply facility of the delivery address, the delivery due date, the undelivered task flag showing that the delivery could not be achieved at the delivery due date, and the responsible deliveryman ID for identifying the deliveryman responsible for the delivery.

The delivery list can be sorted using the undelivered task flag so that the delivery to the supply facility having the undelivered task flag is prioritized (in FIG. 6, it can be seen that data of the undelivered task flag of 1 is placed at the upper side of the delivery list).

The delivery list of FIG. 6 shows the data responsible for a certain deliveryman (and thus shows one deliveryman ID only). The delivery list also can collect the data of supply facilities within one business office and one responsible area to allocate the data depending on the delivery capabilities of the respective deliverymen (e.g., the number of gas cylinders that can be delivered per day). In one embodiment, the data is allocated to the deliverymen so that the data is allocated to the respective deliverymen of one business office and one responsible area in a predetermined order. The predetermined order is calculated by calculating the number of allocatable gas cylinders based on a difference between the number of daily-deliverable gas cylinders of the respective deliveryman and the number of already-allocated gas cylinders to allocate the gas cylinders in an order from a deliveryman having a higher number of allocatable gas cylinders. When two deliverymen A and B have 60 deliverable gas cylinders per day and 50 deliverable gas cylinders per day, respectively for example, then the data is firstly allocated to the deliveryman A having 60 deliverable gas cylinders. When data of 11 or more gas cylinders is allocated to the deliveryman A, then the deliveryman A has allocatable gas cylinders lower than 50 allocatable gas cylinders of the deliveryman B. Thus, the data is allocated to the deliveryman B. It is noted that deliverymen who are scheduled to take a vacation on the delivery due date is excluded from the allocation targets.

Next, the data communication unit 214 transmits the delivery list prepared in Step 803 to the mobile terminal 105 carried by the respective deliverymen (Step 804). When the delivery list prepared in Step 803 includes data for a plurality of deliverymen, the data is divided into pieces of list data for the respective deliverymen and the divided pieces of data are sent. After Step 804, this processing is completed.

The invention claimed is:

1. A method implemented by one or more computers provided at a data center for predicting a delivery due date for a liquefied petroleum (LP) gas delivery business and preparing a delivery list for gas cylinders to be filled with LP gas in LP gas filling stations and to be delivered to customer homes on next day, the one or more computers comprising:
   one or more processors; and
   memory coupled to the one or more processors, the memory storing:
      supply facility data including a supply facility ID, a gas capacity of a supply facility, a set number of the supply facility, and a previous delivery date; and
      customer data including a customer ID, the supply facility ID for a supplier, and a previous indicative value,
   the method comprising:
   acquiring, by the one or more processors, customer data from the memory for each of the facility ID;
   deriving, by the one or more processors, usage of the acquired customer data for each of the supply facility ID based on a difference between the current meter indication value and the previous indication value;
   deriving, by the one or more processors, total usage of the usage of the acquired customer data which have the same supply facility ID;
   acquiring, by the one or more processors, the supply facility data from the memory which has the supply facility ID of the acquired customer data;

deriving, by the one or more processors, a master capacity for each of the supply facility based on the gas capacity of the supply facility and the set number of the supply facility;

predicting, by the one or more processors, a delivery due date at which the supply facility will have a gas shortage based on the master capacity, the previous delivery date, and the total usage;

preparing, by the one or more processors, the delivery list based on (1) the supply facility data which the delivery due date is a due date after predetermined days from the next day and (2) the supply facility data of an undelivered task for which the delivery due date is yesterday, the predetermined days are 2 days; and transmitting, by the one or more processors, the delivery list to a mobile terminal carried by each deliveryman;

wherein the mobile terminal is configured to display the delivery list on a display screen of the mobile terminal; and wherein the gas cylinders are to be delivered to each of customer homes on next day and to be filled with the LP gas in the LP gas filling stations in response to the displaying of the delivery list.

2. The method according to claim 1, wherein: the delivery list is sorted so that a supply facility included in the undelivered task is prioritized as a delivery address.

3. The method according to claim 1, wherein: the delivery list is prepared for each deliveryman based on the delivery capability of each deliveryman of one business office and one responsible area.

4. The method according to claim 3, wherein: the delivery capability is a cylinder count that can be delivered to the supply facility by the each deliveryman per day.

5. A computer-readable storage medium storing computer-executable instructions, that when executed, cause a computer provided in a data center to execute operations for predicting a delivery due date for a liquefied petroleum (LP) gas delivery business and preparing a delivery list for gas cylinders to be filled with LP gas in LP gas filling stations and to be delivered to customer homes on next day, the computer comprising:
one or more processors; and
memory coupled to the one or more processors, the memory storing:
supply facility data including a supply facility ID, a gas capacity of a supply facility, a set number of the supply facility, and a previous delivery date; and
customer data including a customer ID identifier, the supply facility ID for a supplier, current meter indication value, and a previous indication value,
the method comprising:
acquiring customer data from the memory for each of the supply facility ID;
deriving usage of the acquired customer data for each of the supply facility ID based on a difference between the current meter indication value and the previous indication value;
deriving total usage of the usage of the acquired customer data which have the same supply facility ID;
acquiring the supply facility data from the memory which has the facility ID of the acquired customer data;
deriving a master capacity for each of the supply facility based on the gas capacity of the supply facility and the set number of the supply facility;
predicting a delivery due date at which the supply facility will have a gas shortage based on the master capacity, the previous delivery date, and the total usage;

preparing the delivery list based on (1) the supply facility data which the delivery due date is due date after predetermined days from the next day and (2) the supply facility data of an undelivered task for which the delivery due date is yesterday, the predetermined days are 2 days; and transmitting the delivery list to a mobile terminal carried by each deliveryman, wherein the mobile terminal is configured to display the delivery list on a display screen of the mobile terminal, and wherein the gas cylinders are to be delivered to each of customer homes on next day and to be filled with the LP gas in the LP gas filling stations in response to the displaying of the delivery list.

6. A computer provided in a data center for predicting a delivery due date for a liquefied petroleum (LP) gas delivery business and preparing a delivery list for gas cylinders to be filled with LP gas in LP gas filling stations and to be delivered to customer homes on next day delivery, the computer comprising:
one or more processors; and
memory coupled to the one or more processors, the memory storing:
supply facility data including a supply facility ID, a gas capacity of a supply facility, a set number of the supply facility, and a previous delivery date, and
customer data including a customer ID identifier, the supply facility ID for a supplier, current meter indication value, and a previous indication value,
the computer being configured to:
acquire customer data from the memory for each of the supply facility ID;
derive usage of the acquired customer data for each of the supply facility ID based on a difference between the current meter indication value and the previous indication value;
derive total usage of the usage of the acquired customer data which have the same supply facility ID;
acquire the supply facility data from the memory which has the supply facility ID of the acquired customer data;
derive a master capacity for each of the supply facility based on the gas capacity of the supply facility and the set number of the supply facility;
predict a delivery due date at which the supply facility will have a gas shortage based on the master capacity, the previous delivery date, and the total usage;
prepare the delivery list based on (1) the supply facility data which the delivery due date is due date after predetermined days from the next day and (2) the supply facility data of an undelivered task for which the delivery due data is yesterday, the predetermined days are 2 days;
transmit the delivery list to a mobile terminal carried by each deliveryman;
wherein the mobile terminal is configured to display the delivery list on a display screen of the mobile terminal; and
wherein the gas cylinders are to be delivered to each of customer homes on next day and to be filled with the LP gas in the LP gas filling stations in response to the displaying of the delivery list.

7. The method according to claim 2, wherein: the delivery list is prepared for each deliveryman based on the delivery capability of each deliveryman of one business office and one responsible area.

8. The method according to claim 7, wherein: the delivery capability is a cylinder count that can be delivered to the supply facility by the each deliveryman per day.

\* \* \* \* \*